(12) United States Patent
Friend et al.

(10) Patent No.: US 6,493,084 B1
(45) Date of Patent: Dec. 10, 2002

(54) COLOR MEASUREMENT INSTRUMENT WITH MULTIPLE PROTOCOL INTERFACE

(75) Inventors: Timothy R. Friend, Grandville, MI (US); Douglas V. Baker, Middleville, MI (US)

(73) Assignee: X-Rite, Incorporated, Grandville, MI (US)

( * ) Notice: Subject to any disclaimer, the term of this patent is extended or adjusted under 35 U.S.C. 154(b) by 0 days.

(21) Appl. No.: 09/411,484

(22) Filed: Oct. 1, 1999

Related U.S. Application Data

(60) Provisional application No. 60/113,754, filed on Dec. 23, 1998.

(51) Int. Cl.[7] .................................................. G01J 3/50
(52) U.S. Cl. ........................ 356/402; 356/326; 356/319
(58) Field of Search ................................ 356/319, 326, 356/328, 300, 402; 250/226

(56) References Cited

U.S. PATENT DOCUMENTS

| | | | |
|---|---|---|---|
| 4,591,978 A | 5/1986 | Peterson et al. | |
| 5,267,178 A | 11/1993 | Berner | |
| 5,311,294 A | 5/1994 | Cromer et al. | |
| 5,400,138 A | 3/1995 | Peterson et al. | |
| 5,706,816 A | * 1/1998 | Mochizuki et al. | 600/443 |
| 5,860,924 A | * 1/1999 | Quistgaard | 600/441 |
| 5,876,342 A | * 3/1999 | Chen et al. | 600/443 |
| 6,123,669 A | * 9/2000 | Kanda | 600/443 |
| 6,338,030 B1 | * 1/2002 | Senn et al. | 356/319 |

FOREIGN PATENT DOCUMENTS

| | | |
|---|---|---|
| DE | 3347326 | 7/1985 |
| GB | 2302489 A | 1/1997 |

OTHER PUBLICATIONS

Flyer entitled "X–Rite Color DTP92 Monitor Optimizer" published by X–Rite Incorporated (1997).

* cited by examiner

*Primary Examiner*—F. L. Evans
(74) *Attorney, Agent, or Firm*—Warner Norcross & Judd LLP

(57) ABSTRACT

A color measurement instrument wherein the communication protocol used by the instrument is determined by the cable attached to the instrument. The instrument includes a handheld unit having a control system capable of communicating in at least two different protocols through a common connector. This control system connector includes a set of pin-outs corresponding to each of the available protocols. The instrument also includes a cable having a connector mated with the control system connector. The pin-out of the cable connector corresponds to only one of the sets of pin-outs of the control system connector, so that the cable provides a communication pathway corresponding to only one of the available protocols.

25 Claims, 9 Drawing Sheets

COLOR MEASUREMENT INSTRUMENT WITH MULTIPLE PROTOCOL INTERFACE

PRIORITY CLAIM

This application claims the benefit of U.S. Provisional Application No. 60/113,754, filed Dec. 23, 1998 and entitled USB COLOR MEASUREMENT DEVICE.

BACKGROUND OF THE INVENTION

1. Field of the Invention

The present invention relates to color measurement instruments, and more particularly to color measurement instruments capable of communicating in multiple protocols.

2. Description of Art

Color measurement instruments are capable of reading a color for the subsequent conversion of the color to a mathematical representation. That representation can be processed using techniques known to those skilled in the art to perform color functions such as calibration. Color measurement instruments include, by way of illustration and not limitation, spectrophotometers, colorimeters, densitometers, and spectroradiometers.

One particularly useful color measurement instrument is a monitor colorimeter (also known as a colorimetric radiometer) manufactured and sold by X-Rite Incorporated (X-Rite) of Grandville, Mich. as Model No. DTP92Q. This colorimeter is a tethered desktop unit for monitor calibration, and it includes a handheld unit and a cord for connecting the unit to the serial port of a computer. The handheld unit can be positioned over a portion of a monitor screen to read the color displayed on that portion of the screen. The color information or representation is communicated to the computer through the cord. The communication protocol for the colorimeter is RS232. The color information received by the computer from the colorimeter can be processed using color management software such as that sold by X-Rite under the trademark COLOR SHOP or that sold by Apple Computer under the trademark COLORSYNC.

While the DTP92Q colorimeter has enjoyed widespread popularity, it is dependent on the RS232 protocol. Although RS232 has been the serial communication protocol standard for a considerable period, computer manufacturers and the computer industry are developing new and improved protocols. For example, the Universal Serial Bus Implementers Forum (USBIF) recently developed a new protocol known as Universal Serial Bus (USB); and Apple Computer is phasing out the inclusion of RS232 serial ports on new computers. A unit such as the DTP92Q, which is capable of communicating only in the RS232 protocol, is not compatible with the USB protocol. Additional future changes in communications protocols are anticipated. For example, one such protocol is known as Fire Wire. Accordingly, it is possible that a colorimeter redesigned for the USB protocol may itself be outdated shortly.

SUMMARY OF THE INVENTION

The aforementioned problems are overcome in the present invention wherein a color measurement instrument is capable of multiple communication protocols each associated with a unique interface cable. The implemented protocol is selected by connecting the appropriate cable to the handheld unit—either during manufacture or during subsequent service.

More specifically, the color measurement instrument includes on-board hardware, firmware and/or software capable of communicating in a variety of protocols through a common internal connector. Any one of a variety of cables may be connected to the connector. Each of the cables is uniquely associated with a particular communication protocol and includes a connector interfitting with the connector within the instrument. Appropriate connections are made between the cable connector pin-outs and the on-board connector pin-outs so that the instrument communicates though the cable in the selected protocol.

In the disclosed embodiment, the instrument is capable of communicating in both the RS232 protocol and the USB protocol. A first cable is unique to the RS232 protocol, and a second cable is unique to the USB protocol. Either cable may be connected to the instrument, and particularly to the internal connector. After a particular cable has been connected, the instrument communicates in the selected protocol through the cable.

As will be appreciated, the present invention is not restricted to the particular protocols disclosed. The invention is readily extendable to other exiting protocols and to future communication protocols.

The present invention provides improved flexibility for color measurement instruments. With the exception of the cable, the instrument is "generic" to all protocols. Only the cable varies by instrument to implement a desired protocol. The "generic" design of the instrument simplifies manufacture, testing, and calibration. During manufacture, the instrument can be tested and calibrated using any one of the available protocols.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
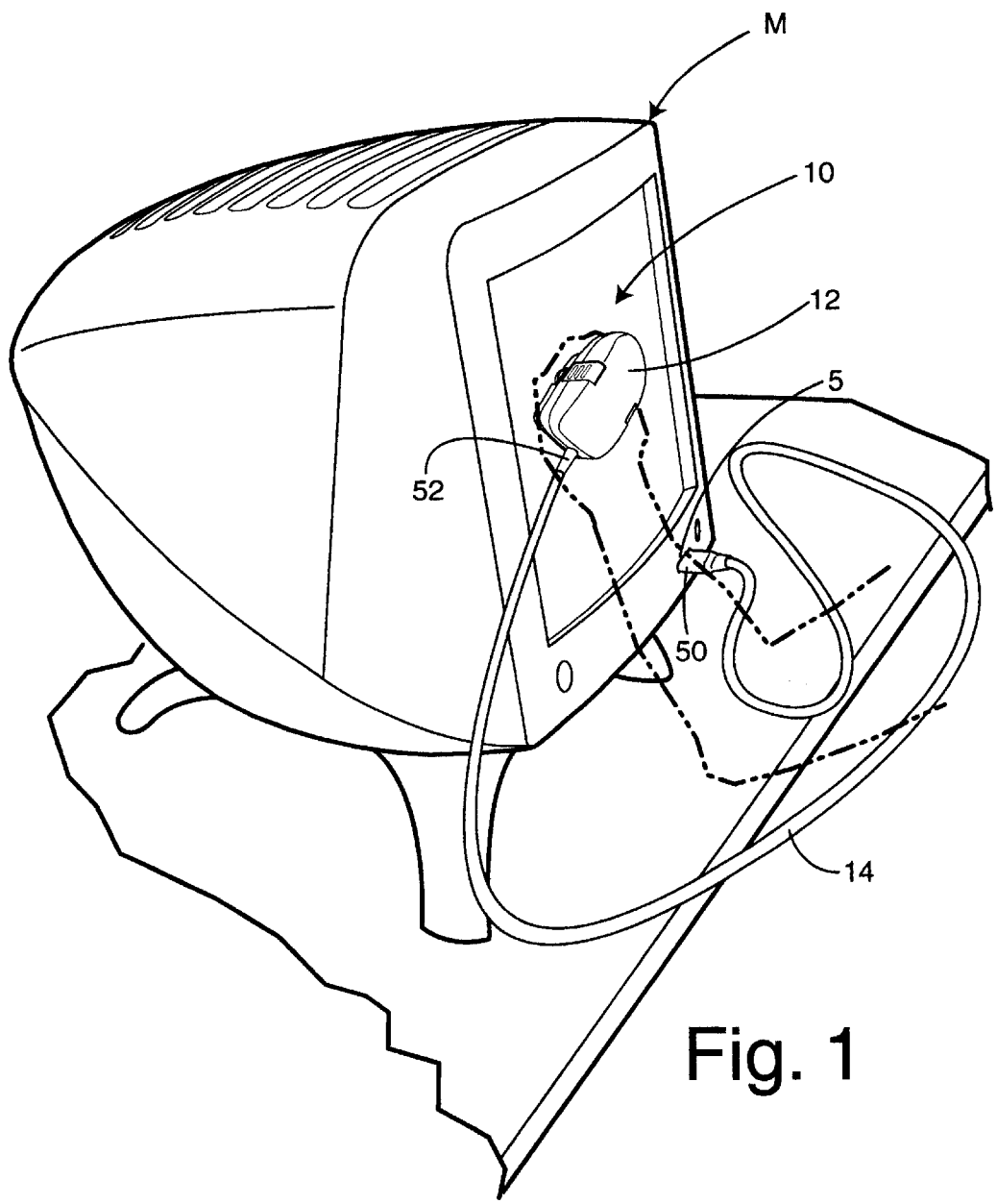
FIG. 1 is a perspective view showing the color measurement instrument of the present invention in conjunction with a computer monitor.
Figure 2:
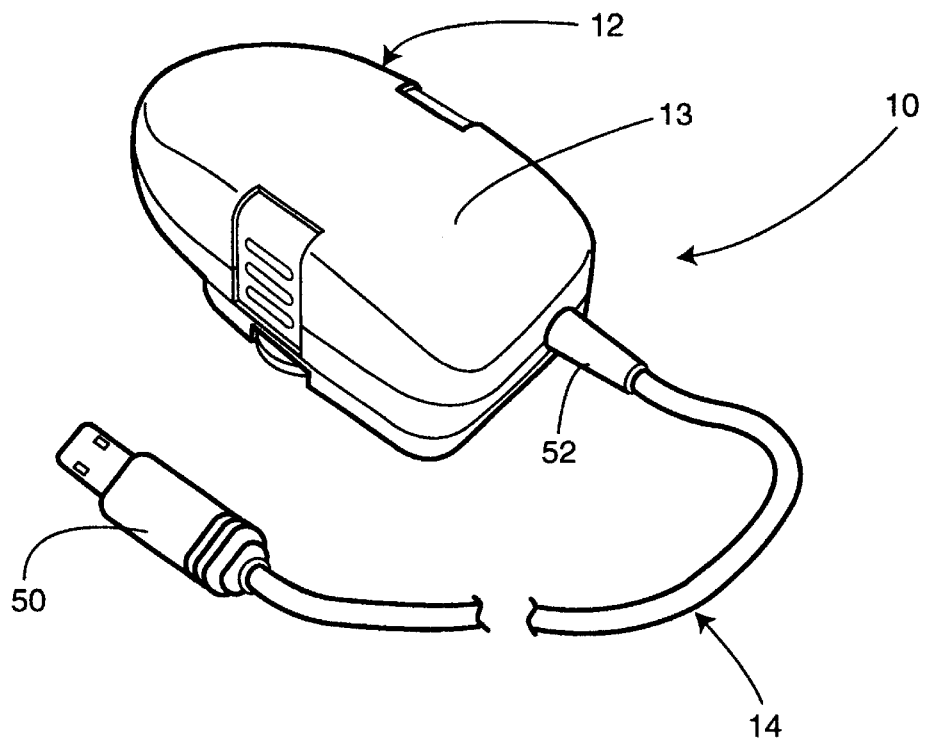
FIG. 2 is a perspective view of the instrument of the present invention.

A color measurement instrument constructed in accordance with a preferred embodiment of the invention is illustrated in FIGS. 1 and 2 and generally designated 10. As disclosed, the instrument 10 is a monitor colorimeter (also known as a colorimetric radiometer). However, the invention is considered to encompass any color measurement instrument including, but not limited to, spectrophotometers, colorimeters, densitometers, and spectroradiometers.

Figure 3:
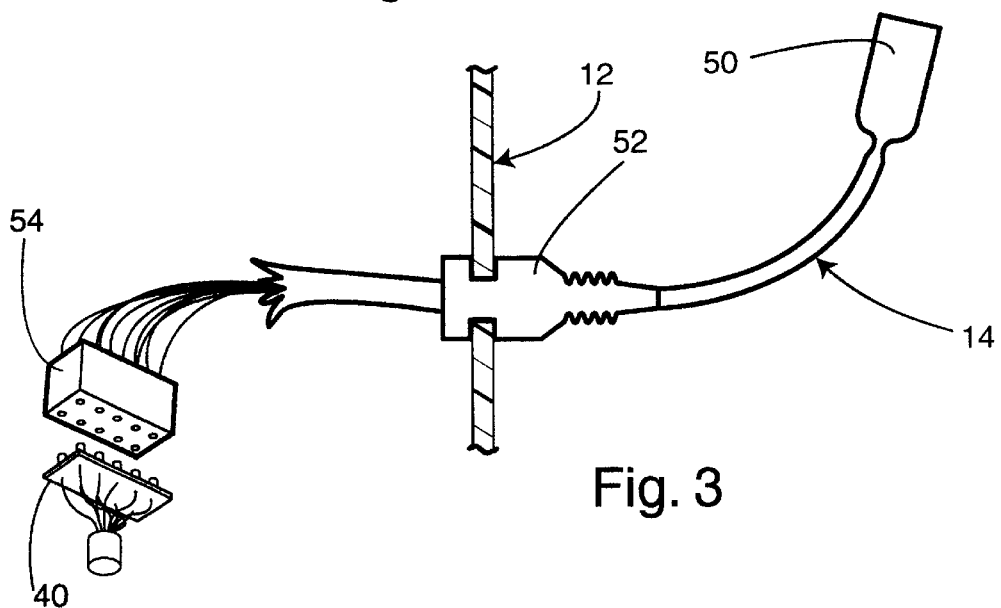
FIG. 3 is a detailed view showing the connection of the communication cable to the handheld unit.

The instrument 10 includes a handheld unit 12 and a cable or cord 14. The handheld unit is capable of communicating in multiple communication protocols. Any particular cable 14 is unique to a particular communication protocol. The cable illustrated in FIGS. 1–3 is adapted for communication in the Universal Serial Bus (USB) protocol.

With the exception of the multiple communication protocol capability to be described, the handheld unit 12 is generally well known to those skilled in the art. For example, one similar unit has been sold by X-Rite as a monitor colorimeter under the model designation DTP92Q. Accordingly, this description will focus on the new invention related to the multiple communication protocol capability.

Figure 4:
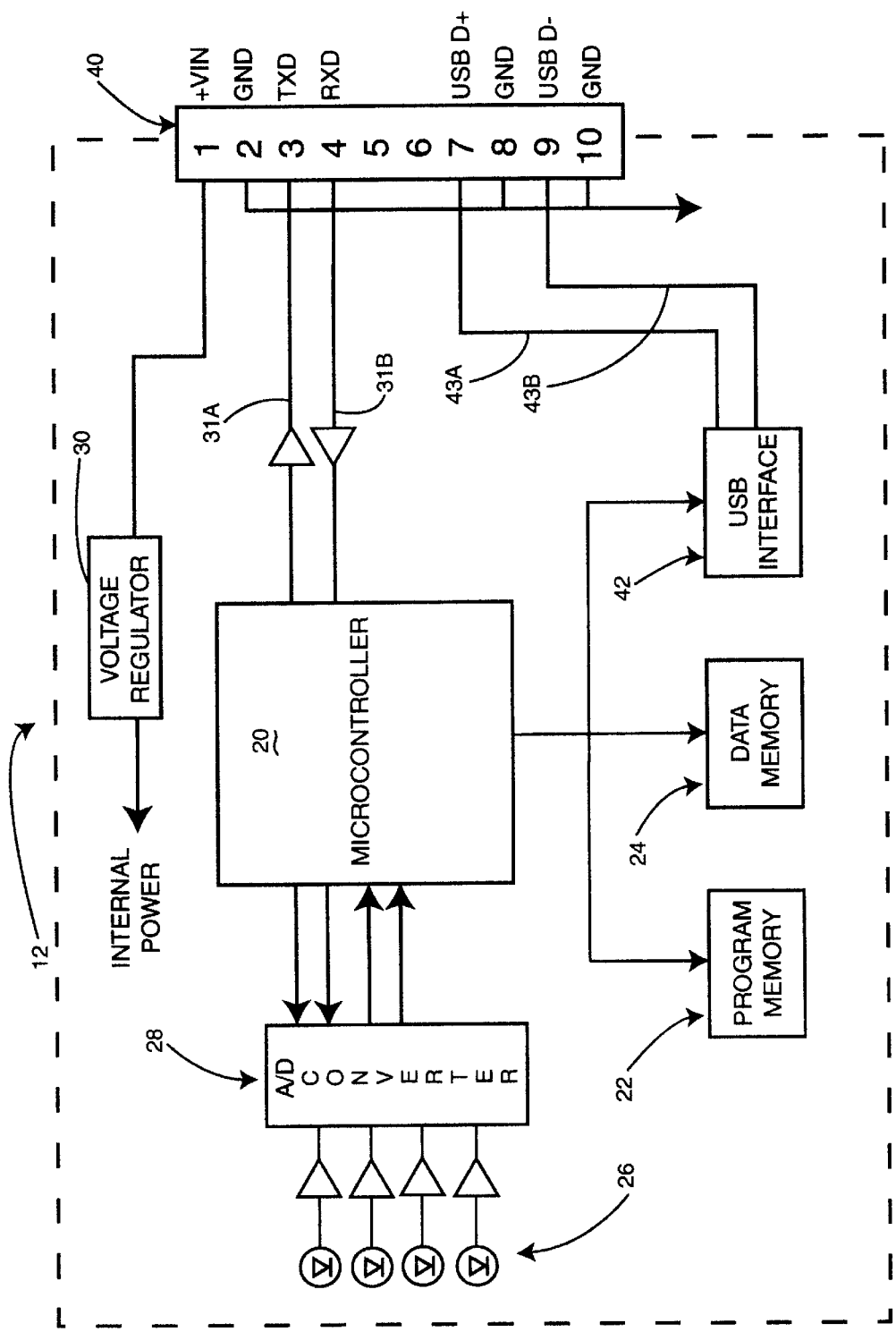
FIG. 4 is a schematic diagram of the handheld unit.

The hardware of the handheld unit 12 is schematically illustrated in FIG. 4. The prior art components within that handheld unit include a microcontroller 20, a program memory 22, a data memory 24, photodiodes 26, an A/D (analog to digital) converter 28, and a voltage regulator 30. Accordingly, these components will be described only briefly. The microcontroller 20 provides overall control for the unit 12. More specifically, the microcontroller 20 receives digital input from the photodiodes 26 through the A/D converter 28 and converts those signals to coordinates in a color space. The acquired data is stored in the data memory 24. The firmware or software program control is stored in the program memory 22. The voltage regulator 30 provides internal regulated power to the unit 12.

The new components within the handheld unit 12 include the ten-pin connector 40, the USB interface chip 42, and the associated electrical connections. These components are commercially available, but are uniquely used within the present instrument as part of the present invention.

The USB interface chip 42 operates within the USB protocol. More specifically, the chip 42 defines four subsets of the USB protocol and is capable of communicating within any one of those subsets. The present invention utilizes only the "bulk transfer" subset, but other subsets could be used in its place. The interconnection/interface of the USB chip 42 with the microcontroller 20 is well known to those skilled in the art. Alternatively, the microprocessor 20 and the USB interface could be incorporated into a single chip, and such chips are commercially available. Other implementations will be recognized by those skilled in the art.

The connector 40 (FIGS. 3–4) is an in-line, ten-pin connector conventional in the art. Other connectors, both known and developed in the future, could also be readily used to implement the present invention. FIG. 4 illustrates the pin-outs of the ten-pin connector. Pin 1 is connected to the input voltage (+VIN). Pins 2, 8, and 10 are commonly connected to ground (GND). Pin 3 is connected to the microcontroller 20 via the RS232 transfer data (TXD) line 31a, and pin 4 is connected to the microcontroller 20 via the RS232 receive data line (RXD) 31b. Pin 7 is connected to the USB chip 42 via the USB data high (USBD+) line 43a, and pin 9 is connected to the USB chip 42 via the USB data low (USBD−) line 43b. Pins 5 and 6 are "spares" that are not assigned.

The USB cable 14 (FIGS. 1–3 and 5) includes a USB connector 50, a strain relief 52, and a ten-pin connector 54 (see FIG. 3). The USB cable 14 includes at least four wires/connections to communicate in the USB protocol. The USB connector 50 is known to those skilled in the art and is suited for insertion into a USB socket S, for example in the front of monitor M as illustrated in FIG. 1. The strain relief 52 is also well known to those skilled in the art and reduces strain on the cable 14 where it passes through and is connected to the unit 12. See FIG. 3.

Figure 6:
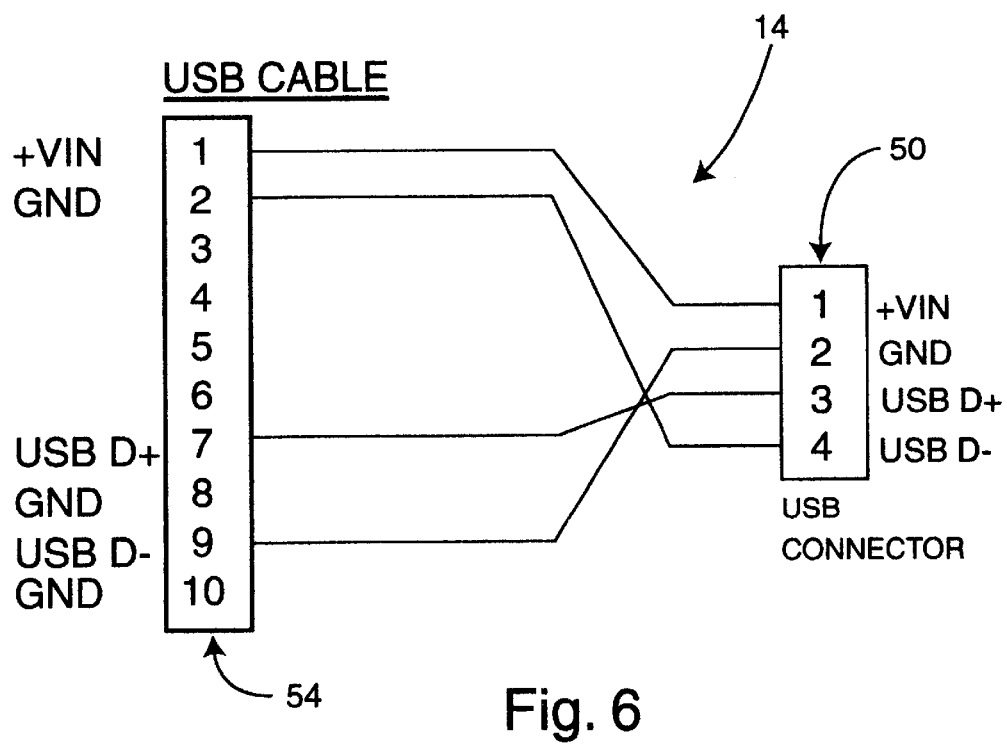
FIG. 6 is a schematic diagram of the USB cable.

The individual connections between the pins of the USB connector 50 and the ten-pin connector 54 on the opposite ends of the USB cable 14 are illustrated in FIG. 6. Specifically, pins 1–4 of the USB connector 50 are connected to pins 1, 9, 7, and 2, respectively, of the ten-pin connector 54. Accordingly, pin 1 of the ten-pin connector provides an input voltage; pin 2 provides a ground; pin 7 provides data high; and pin 9 provides data low.

As perhaps best illustrated in FIG. 3, the ten-pin connector 54 of the cable 14 can be physically connected to the ten-pin connector 40 of the unit 12. When so connected, the pin-outs 1–10 of the connector 54 are connected to the associated pin-outs 1–10 of the connector 40. When so connected, the voltage regulator is operatively connected to the input voltage (+VIN); the grounds (GND) are connected; and the data lines (USBD+ and USBD−) are connected through lines 43a and b to the USB interface chip 42. The unit 12 therefore receives appropriate power and is grounded. Similarly, the microcontroller is capable of communicating in the USB protocol through the chip 42.

Figure 5:
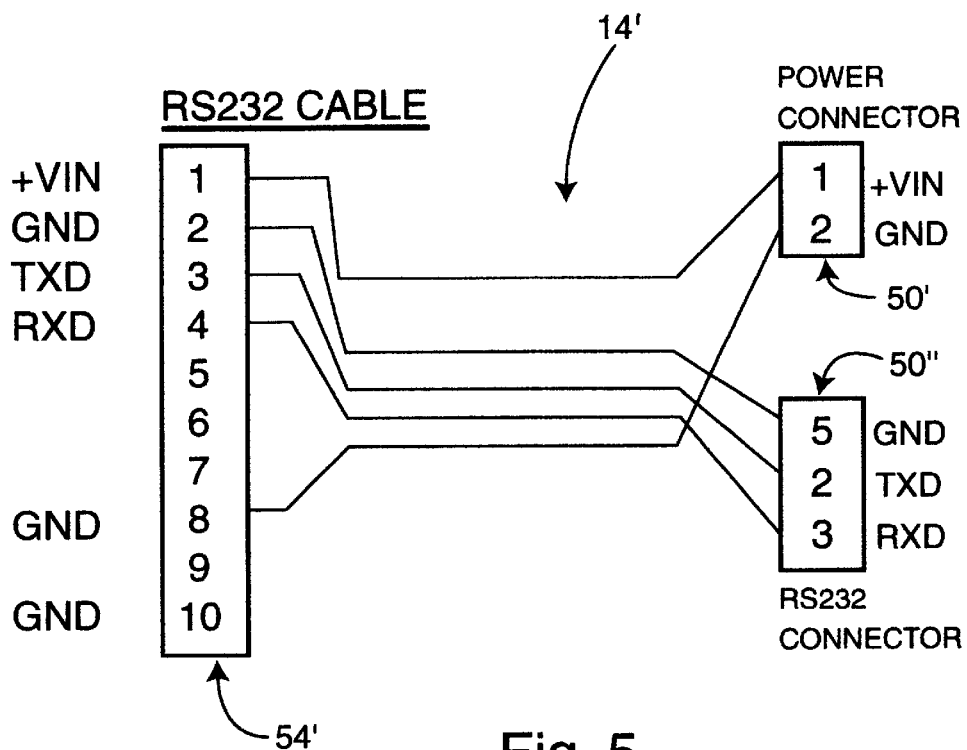
FIG. 5 is a schematic diagram of the RS232 cable.

The RS232 cable 14' is illustrated in FIG. 5 and includes a power connector 50', an RS232 connector 50", and a ten-pin connector 54'. All three connectors are of a type known to those skilled in the art. Pins 1 and 2 of the power connector 50' are electrically connected to pins 1 and 8 of the 10-pin connector 54'. Pins 2, 3, and 5 of the RS 232 connector 50" are electrically connected to pins 3, 4, and 2 of the connector 54'. Accordingly, the input voltage (+VIN) is supplied to pin 1 of the connector 54'; ground (GND) is applied to pins 2 and 8; and data lines (TXD and RXD) are applied to pins 3 and 4.

Alternatively, a single cable having both types of connectors—one for each protocol—connected thereto could be used. In such case, only one of the connectors would be connected to the instrument at any given time; and the necessary pin-outs for both protocols would be included in the single cable.

Assembly and Operation

All of the electrical components schematically illustrated in FIG. 4 are mounted within the handheld unit 12 and are connected to each other using techniques customary in the art. The ten-pin connector 40 is available within the unit 12 for connection to one of the cables 14 or 14'.

During manufacture, only one of the cables 14 or 14' is connected to the ten-pin connector 40. When the USB cable 14 is connected to the unit 12 (see FIGS. 4–5), the following pin-out connections are made: +VIN, GND, USBD+ and USBD−. When the RS232 cable 14' is connected to the unit 12, the following pin-out connections are made: +VIN, GND, TXD, and RXD. Accordingly, the appropriate and necessary pin-outs for the protocol uniquely associated with the corresponding cable 14 or 14' are automatically connected as the ten-pin connectors are physically interconnected. After the selected cable has been connected to the connector 40, the housing 13 is closed upon the strain relief 52 to capture the cable 14 or 14' in fixed position with respect to the handheld unit 12.

It presently is not expected that the ultimate consumer and/or user of the instrument 10 will change the cable connected to the handheld unit 12. However, it is possible that trained service representatives could make a cable substitution to change the protocol in which the instrument communicates. To do so, the service personnel simply opens the housing 13; removes the existing cable 14 or 14'; installs the "other" cable 14 or 14'; and then closes the housing 13.

As will be appreciated from the following description of the firmware/software, no other changes are required to change the communication protocol of the instrument 10.

It also is possible that the connector 40 could be located so as to be accessible from outside of the housing 13. Such a construction would enable the ultimate consumer and/or user of the instrument 10 to readily and easily change the cable connected to the unit, and thereby change the communication protocol. In any of the implementations, it is possible that the instrument 10 will obtain all of its power requirements (in all modes of the instrument and in all protocols) through the connected cable.

Figure 7:
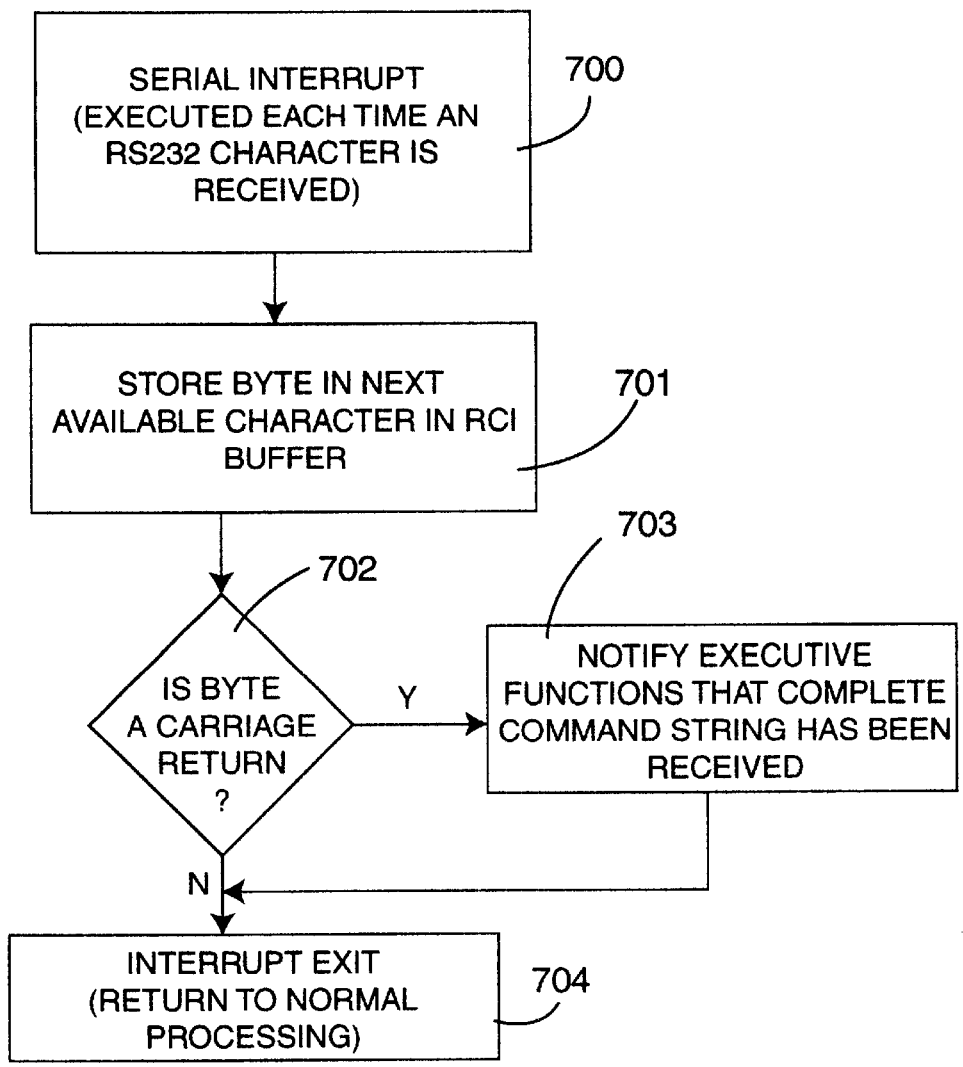
FIGS. 7–8 are flow charts illustrating the operation of the prior art instrument in the RS232 protocol.
Figure 8:
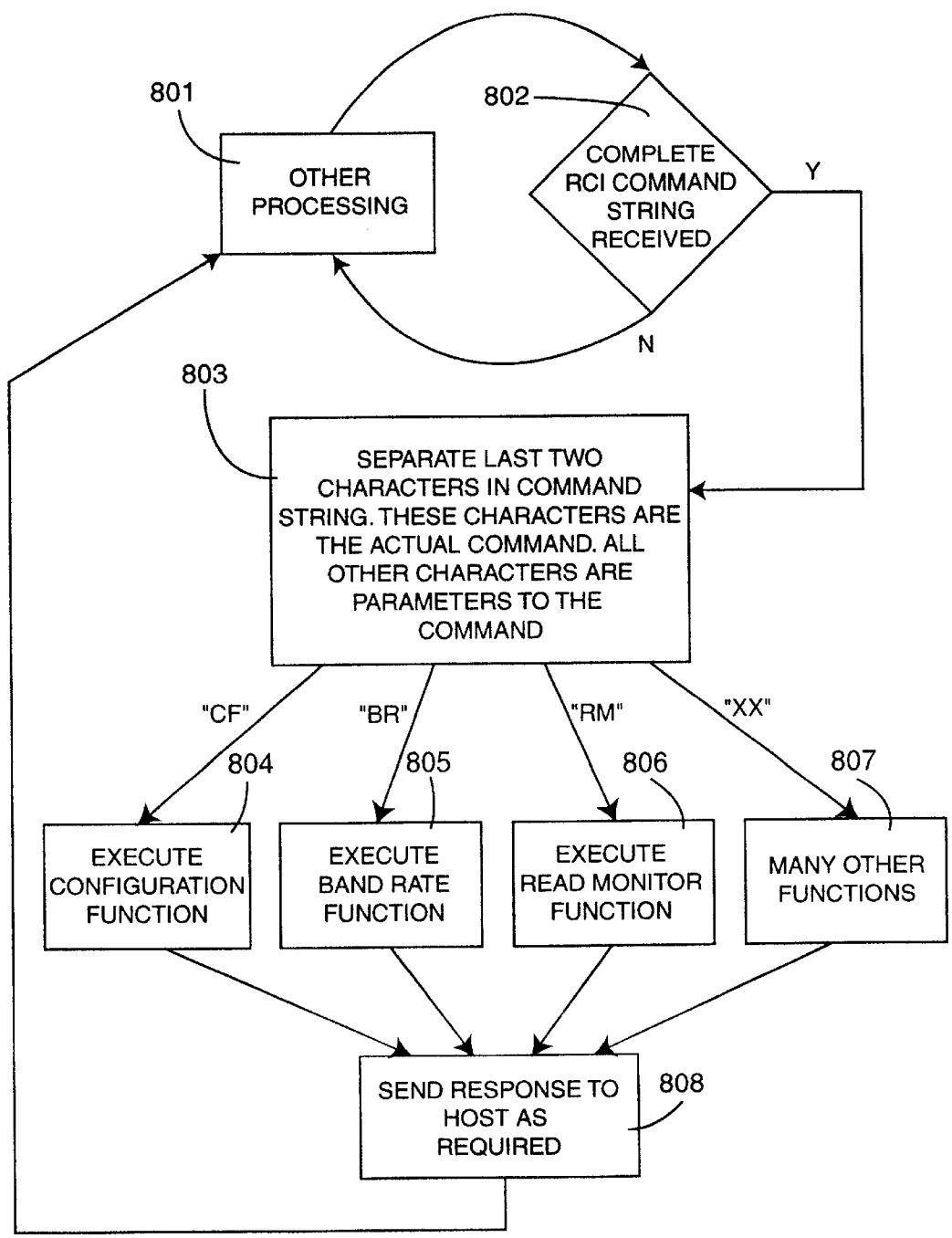

The prior art software/firmware of the prior art unit is illustrated in FIGS. 7–8.

This software/firmware is carried into the present instrument 10. The serial communication subroutine is illustrated in FIG. 7 and is executed 700 each time that the microcontroller 20 receives an interrupt signal indicating that an RS232 character must be processed. The received character is stored 701 in the next available character in the RCI (Remote Control Interface) buffer. If 702 the byte is a carriage return, then the executive functions subroutine (see FIG. 8) is notified 703 that a complete command string has been received. If 702 the byte is anything other than a carriage return, then the interrupt subroutine is exited 704. As described and as is conventional, the RS232 serial communication occurs character by character.

The prior art software/firmware for the executive functions subroutine is illustrated in FIG. 8. This software/firmware is carried forward into, and supplemented in, the present instrument 10. All of the "other processing" of the unit 10 is illustrated as box 801. When the serial communication subroutine (FIG. 7) indicates that a complete RCI string has been received 802, control passes to box 803. If 802 a complete RCI command string has not been received, control returns to the other processing 801. In box 803, the last two characters of the command string are separated from the remainder of the string. The last two characters specify the command to be performed, and the remainder of the string contains the parameters to the command. If the command characters are CF, a configuration function is executed 804. If the command characters are BR, a band rate function is executed 805. If the command characters are RM, a read monitor function is executed 806. Similarly, other commands generically designated XX will cause other functions to be executed 807. After the appropriate function has been executed, a response is sent 808 to the host computer indicating that the command has been processed and transferring any data that may have been requested by the host computer.

Figure 9:
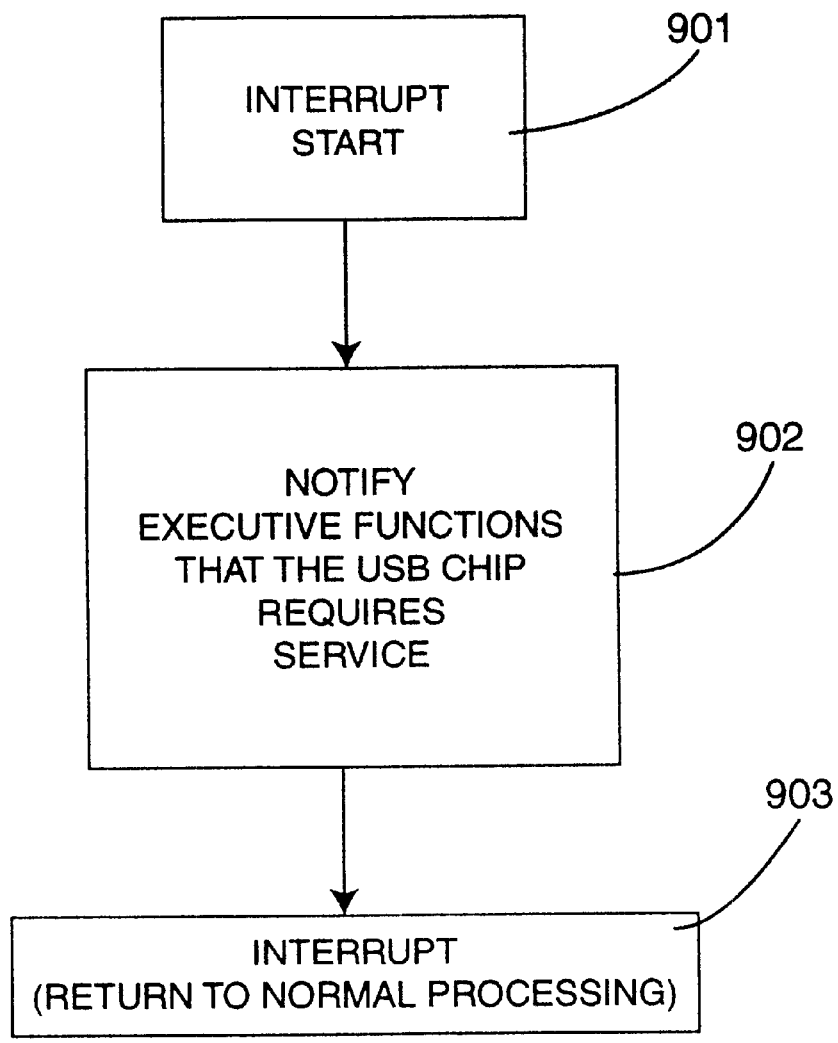
FIGS. 9–11 are flow charts illustrating the operation of the present instrument in multiple protocols.

FIG. 9 illustrates the USB interrupt routine which is new to the instrument 10. The routine starts 901 when an interrupt signal is received from the USB interface chip 42 (see FIG. 4). USB communication occurs in packets rather than character by character. An interrupt request is issued by the USB interface chip 42 only when a complete packet, comprising a complete command, has been received by the USB chip 42. The executive functions routine is notified 902 that the USB chip requires service. Program flow then returns 903 to the other processing.

Figure 10:
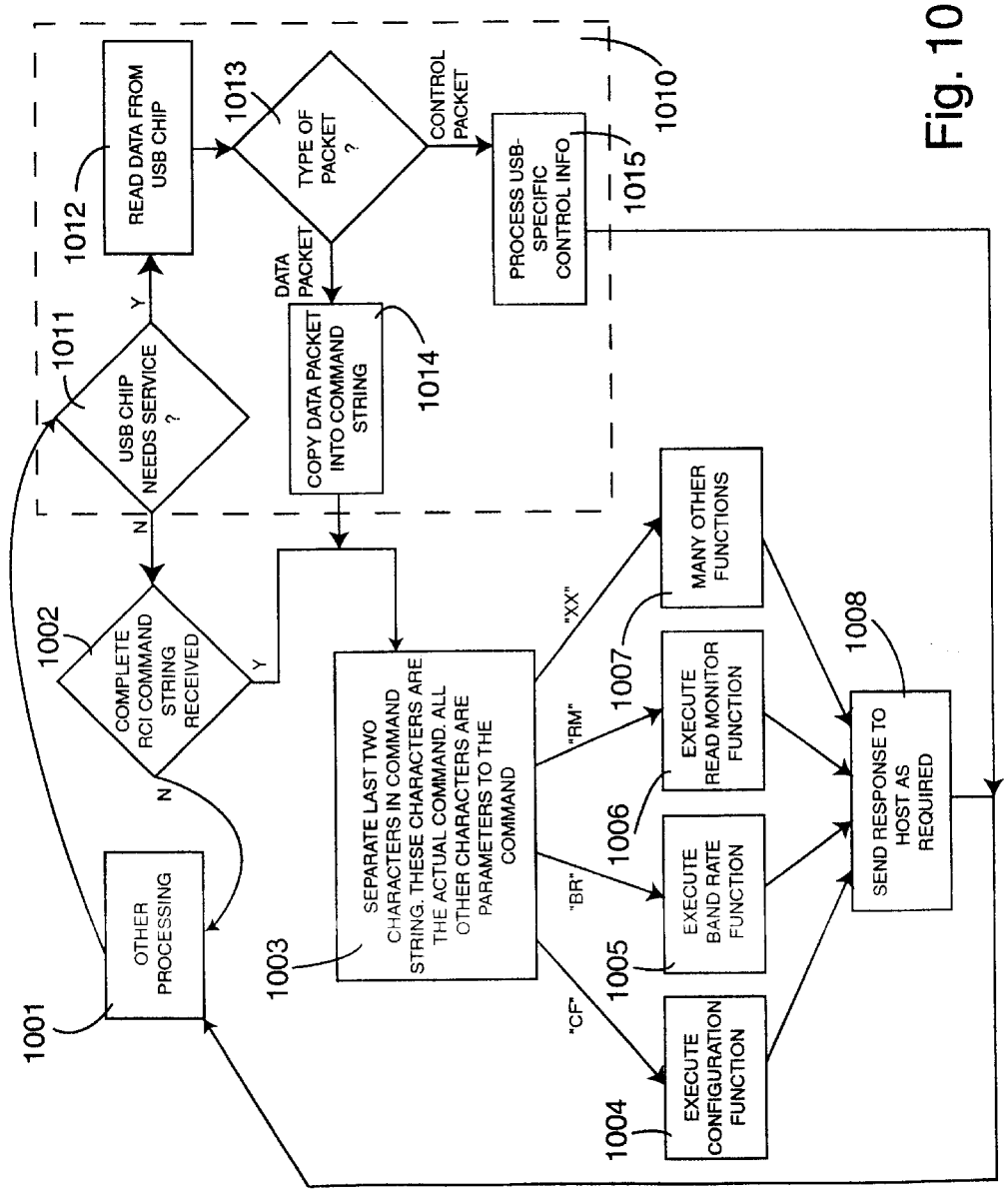

The executive functions subroutine of the present instrument 10 is illustrated in FIG. 10. The portions of the executive functions subroutine outside of the dashed line 810 is identical to the executive functions subroutine of the prior art illustrated in FIG. 8. The boxes 1001 to 1008 of FIG. 10 correspond to boxes 801–808 of FIG. 8. Accordingly, the program flow and operation illustrated in those boxes will not be re-described.

The portion of the executive function subroutine within the dashed line 810 is specific to the USB interface and provides a second communication protocol. When an interrupt is issued by either the RS232 interface on the microcontroller 20 or the USB chip 42, program flow passes to block 1011. If 1011 the USB chip 42 requires service, data is read 1012 from the chip; and program flow passes to box 1013. If 1011 the USB chip 42 does not require service, program flow passes to box 1002 for the function previously described.

The type of USB packet is determined 1013. If the packet is a data packet, the data packet is copied 1014 into the command string; and control passes to the previously described block 1003. If the packet is a control packet, the USB-specific control information is processed 1015; and program flow returns to the other processing 1001.

Figure 11:
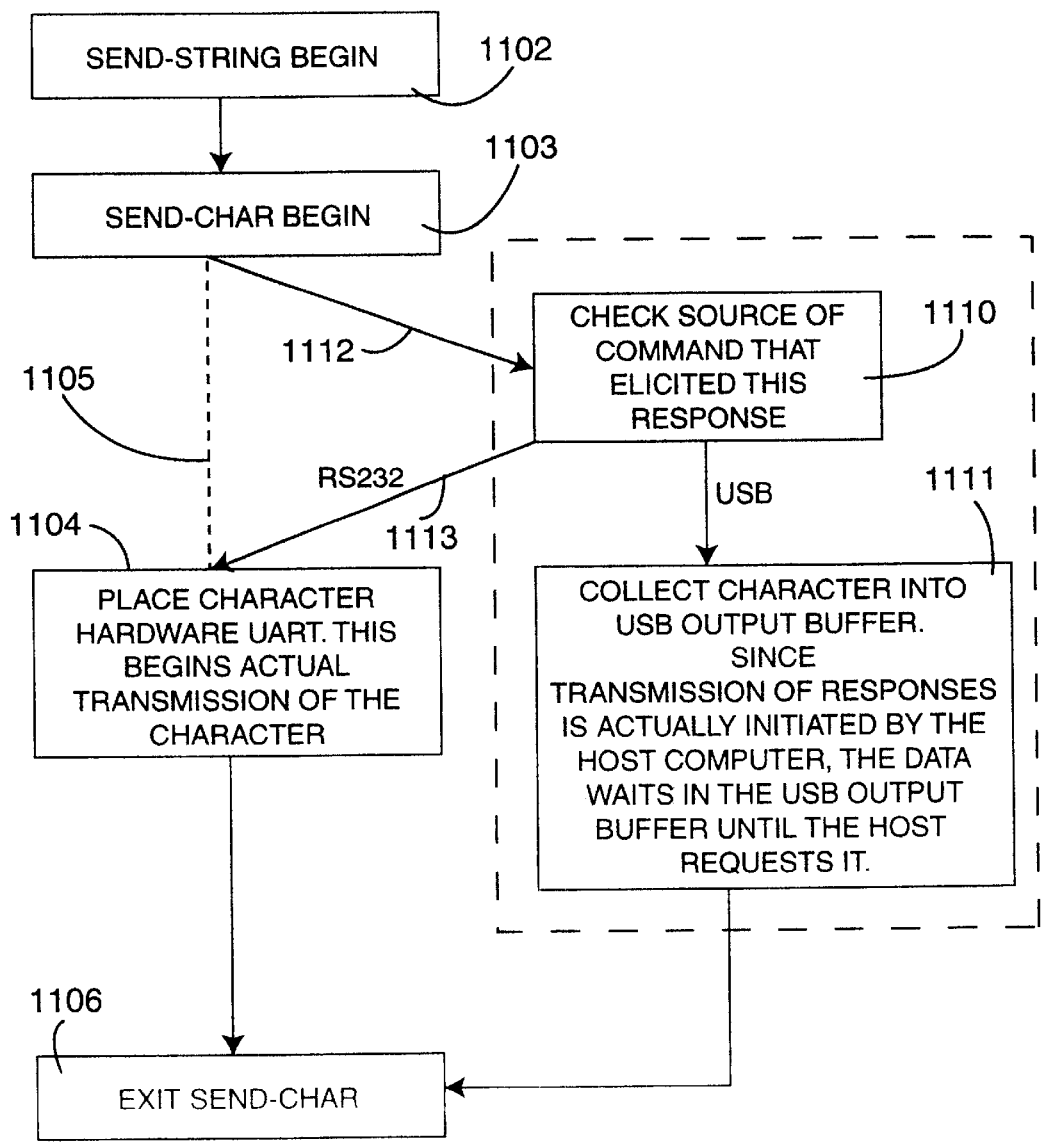

The send-string routine is illustrated in FIG. 11 and is utilized to send information out of the unit 12 through the connector 40. In a fashion similar to FIG. 10, the prior art portion of the send-string routine is outside of dashed line 1101; and the new portion of the send-string routine is inside the dashed line 1101.

The prior art portion of the routine will be described first. Within the send-string routine 1102 the send character function 1103 is called for each character in the string. In the prior art send-character function, control passed directly from block 1103 to block 1104 as indicated by dashed line 1105. In block 1104, an individual character is placed 1104 in the hardware UART to begin transmission of the character. Program flow then passes to block 1106, wherein the send-character subroutine is exited.

In the current send-character function, the program flow line 1105 of the prior art function is replaced by program flow lines 1112 and 1113. Accordingly, program flow cannot pass directly from block 1103 to block 1104. Upon initiation of the send character function, program flow passes to block 1110. The blocks 1110 and 1111 additionally check for and handle USB transmissions. If 1110 the source is RS232, program flow passes to block 1104. On the other hand, if 1110 the command is a USB command, program flow passes to block 1111. The character is collected 1111 in the USB output buffer, and program flow passes to block 1106 wherein the send character-function is terminated. As noted in block 1111, the entire string is collected in the USB chip 42 before the string is transmitted to the host computer in response to a request from the host computer.

The unit 10 of the present invention is capable of communicating with a host computer using one of a plurality of communication protocols. Although the present invention has been described in conjunction with the RS232 and USB protocols, the invention is not so limited. Any current or future communication protocol could be used in implementing the present invention. Also, although the present invention has been described in conjunction with two protocols, any number could be implemented by a routine extension of the disclosed methodology.

The individual protocol that an instrument 10 will use is determined by the cable 14 or 14' connected to the handheld unit 12. As illustrated in FIGS. 4–6, the appropriate pin-out connections are made as the connectors cable connector 54 or 54' is physically interconnected with the unit connector 40. The microcontroller 20 and the USB chip 42 are automatically and appropriately connected to the cable to implement the desired communication protocol.

Finally, it is possible that both protocols could be implemented through a single cable including all of the necessary pin-outs. Such an approach has proven to be particularly helpful during design, debugging, testing, and manufacturing planning.

The above description is that of a preferred embodiment of the invention. Various alterations and changes can be made without departing from the spirit and broader aspects of the invention as defined in the appended claims, which are to be interpreted in accordance with the principles of patent law including the Doctrine of Equivalents.

The embodiments of the invention in which an exclusive property or privilege is claimed are defined as follows:

1. A color measurement instrument comprising:
   a housing;
   a color measurement engine within said housing; and
   control means within said housing for controlling said color measurement engine, said control means including first and second communication means for communicating in first and second protocols respectively, the first and second protocols being different from one another, said control means further including a control connector having first pins connected to said first communication means and second pins connected to said second communication means, whereby a cable having a cable connector with third pins corresponding to one of said first and second pins can be connected to said control connector so that the cable provides a communication pathway in the first or second protocol corresponding to the one of said first and second pins.

2. A color measurement instrument as defined in claim 1 wherein at least one of said first pins is different from all of said second pins.

3. A color measurement instrument as defined in claim 1 wherein said cable connector is capable of ready manual connection to said control connector.

4. A color measurement instrument as defined in claim 1 wherein said control connector is within said housing.

5. A color measurement instrument as defined in claim 4 wherein:
   said first pins include a power pin and a ground pin; and
   said second pins also include said power pin and said ground pin.

6. A color measurement instrument comprising:
   a control system capable of communicating in first and second protocols, said first and second protocols being different from one another; and
   a control system connector connected to said control system and including a plurality of pin-outs, a first set of said pin-outs used in the first protocol, a second set of said pin-outs used in the second protocol, said first and second sets being non-identical, whereby a cable including a cable connector having pin-outs corresponding to one of said first and second sets of pin-outs can be connected to said control system connector to provide communication in the corresponding protocol.

7. A color measurement instrument as defined in claim 6 wherein said first set of pin-outs is not identical to said second set of pin-outs.

8. A color measurement instrument as defined in claim 6 wherein said cable connector can be readily manually connected to said control system connector.

9. A color measurement instrument as defined in claim 6 further comprising a housing, said control system and said control system connector being located within said housing.

10. A color measurement instrument as defined in claim 6 wherein:
    said first set of pin-outs includes a power pin-out and a ground pin-out; and
    said second set of pin-outs also includes said power pin-out and said ground pin-out.

11. A color measurement instrument as defined in claim 6 wherein said first and second protocols are RS232 and USB.

12. A color measurement instrument as defined in claim 6 wherein said control system connector comprises a dual-row 10-pin connector.

13. A color measurement instrument capable of communication in two different protocols, said instrument comprising:
    a housing;
    a control system within said housing and including first communication means for communicating in a first protocol and second communication means for communicating in a second protocol;
    a control system connector operatively connected to both of said first and second communication means;
    a first cable having a first connector that may be connected to said control system connector, said first connector and said control system connector having first cooperating pin-outs connecting said first cable with said first communication means; and
    a second cable having a second connector that may be connected to said control system connector, said second connector and said control system connector having second cooperating pin-outs connecting said second cable with said second communication means, said first and second cooperating pin-outs being different from one another so that only one of the first and second protocols is active at any one time.

14. A color measurement instrument as defined in claim 13 wherein said first and second connectors are configured to be incapable of simultaneous operative connection to said control system connector.

15. A color measurement instrument as defined in claim 13 wherein each of said first and second connectors can be readily manually connected to said control system connector.

16. A color measurement instrument as defined in claim 13 wherein said control system connector is inside of said housing.

17. A color measurement instrument as defined in claim 16 wherein each of said first and second cable includes strain relief means for preventing strain between said first and second cables and said housing.

18. A color measurement instrument as defined in claim 13 wherein:
    said first pin-outs include a power pin-out and a ground pin-out; and
    said second pin-outs also include said power pin-out and said ground pin-out.

19. A color measurement instrument as defined in claim 13 wherein said first and second protocols are RS232 and USB.

20. A color measurement instrument as defined in claim 13 wherein said control system connector is a dual-row 10-pin connector.

21. A method of configuring a color measurement instrument for a communication protocol, said method comprising:

providing a color measurement instrument capable of a first communication protocol using a first set of selected pin-outs of a first electrical connector and a second communication protocol using a second set of selected pin-outs of the first electrical connector, the first and second sets being non-identical;

selecting a cable having a second electrical connector with a pin-out configuration corresponding to one of the first and second sets of pin-outs; and connecting the second electrical connector to the first electrical connector.

22. A method as defined in claim 21 wherein:

the first electrical connector is located within an enclosure;

said connecting step includes connecting the second electrical connector to the first electrical connector within the opened enclosure; and further comprising closing the enclosure.

23. A method as defined in claim 22 further comprising providing strain relief between the cable and the enclosure.

24. A method as defined in claim 21 further comprising communicating with the color measurement instrument through the cable in at least one of the RS232 and USB protocols.

25. A method as defined in claim 21 wherein the second electrical connector on the cable includes a pin-out configuration corresponding to both of the first and second sets of pin-outs.

* * * * *